United States Patent [19]

Tateoka et al.

[11] Patent Number: 4,543,491
[45] Date of Patent: Sep. 24, 1985

[54] ORIGINAL READING DEVICE

[75] Inventors: Masamichi Tateoka, Yokohama; Junichi Asano, Hoya; Mitsuru Kurata, Yokohama; Yoshikazu Yokomizo, Kawagoe, all of Japan

[73] Assignee: Canon Kabushiki Kaisha, Tokyo, Japan

[21] Appl. No.: 450,435

[22] Filed: Dec. 16, 1982

[30] Foreign Application Priority Data

Dec. 25, 1981 [JP] Japan .................................. 56-214697

[51] Int. Cl.⁴ .............................................. H01J 40/14
[52] U.S. Cl. ...................................... 250/578; 358/213
[58] Field of Search ................ 250/578; 358/212, 213, 358/293; 355/47, 55; 357/24

[56] References Cited

U.S. PATENT DOCUMENTS

| | | | |
|---|---|---|---|
| 4,044,384 | 8/1977 | Inokuchi | 358/293 |
| 4,337,394 | 6/1982 | Fukushima | 250/578 |
| 4,356,513 | 10/1982 | Yoshimura et al. | 358/213 |
| 4,358,794 | 11/1982 | Kurakami et al. | 250/578 |

*Primary Examiner*—David C. Nelms
*Assistant Examiner*—J. Gatto
*Attorney, Agent, or Firm*—Fitzpatrick, Cella, Harper & Scinto

[57] ABSTRACT

Disclosed is an original reading device in which, of first and second areas of the portion to be read of an original to be read which adjoin each other with a boundary therebetween, the first area is projected upon a first image pick-up element by a first lens and the second area is projected upon a second image pick-up element by a second lens, whereby the first area and the second area are read by the first element and the second element, respectively. The first and second lenses are disposed at positions corresponding to positions more toward the boundary between the first and second areas than the centers of the first and second areas.

4 Claims, 3 Drawing Figures

ORIGINAL READING DEVICE

BACKGROUND OF THE INVENTION

1. Field of the Invention

This invention relates to an original reading device in an apparatus such as a facsimile transmitter or a digital copying apparatus in which original information is converted into electrical signals and a desired image is formed by the electrical signals.

2. Description of the Prior Art

In most original reading devices, an original image is converted into electrical signals by a solid state image pick-up element such as a charge coupled device (CCD). In such reading devices, when it is desired to increase the picture element density to be read on the surface of the original, for example, when it is desired to read 297 mm in the lengthwise direction of a JIS A4 original in 12 dots/mm or 16 dots/mm, the number of necessary picture elements of the solid state image pick-up element such as CCD is as great as 3564 in the former case and as great as 4752 in the latter case.

Now, the number of available picture elements of CCD is maximum 2048 and therefore, as known in Japanese Laid-open patent applications Nos. 102819/1979 and 102820/1979, a system in which a plurality of CCDs are arranged with respect to their electrical scanning direction, namely, the major scanning direction, is adopted.

In principle, the reading device of this type according to the prior art is as shown in FIG. 1 of the accompanying drawings.

In FIG. 1, reference character 1a designates the linear portion of an original to be read placed on an unshown transparent original supporting table lying at a regular position. The area from the end portion 1a' to the central portion 1a'' of the linear portion 1a to be read which is long in S$_1$ direction (major scanning direction) is projected and imaged upon the light-receiving area of CCD 5a by a lens 4a, and the area from the central portion 1a'' to 1a''' is projected and imaged upon the light-receiving area of CCD 5b by a lens 4b. The light-receiving areas of CCDs 5a and 5b are linear and long in S$_1$ direction, and CCDs 5a and 5b electrically scan the image in this direction and convert the optical image into electrical signals. That is, CCD 5a reads the area from 1a' to 1a'' and CCD 5b reads the area from 1a'' to 1a'''. As is well-known, an image pick-up element such as CCD has a light-receiving area comprising a number of picture elements (point-like photoelectric conversion sections) arranged in the major scanning direction, and electrical signals formed by a number of picture elements are successively taken out with respect to the major scanning direction. The original and CCDs 5a, 5b are moved relative to each other in S$_2$ direction (minor scanning direction) perpendicular to the plane of the drawing sheet of FIG. 1 and the CCDs read the original from one end to the other with respect to the minor scanning direction. In FIG. 1, the optical axis Xa of the lens 4a enters the center of the area between points 1a' and 1a'' and the optical axis Xb of the lens 4b enters the center of the area between points 1a''' and 1a''. Reference characters 9a and 9b designate principal rays pointing to CCD 5a from points 1a' and 1a'', and reference characters 9c and 9d denote principal rays pointing to CCD 5b from points 1a'' and 1a'''. As is apparent from the foregoing, all of the angles formed by the principal rays 9a, 9b, 9c and 9d with the optical axes Xa and Xb, respectively, are θ. In other words, the angles of view of the lens 4a to the points 1a' and 1a'' and the angles of view of the lens 4b to the points 1a'' and 1a''' are all equal.

The above-described construction has the following inconveniences.

The imaging principal ray generally has an oblique angle with respect to the surface of the original and therefore, if the original supporting table flexes due to the weight of a book or the like thereon or the original floats up from the original supporting table, lack or overlap of information occurs in the boundary 1a'' of the linear portion to be read. This will be described with reference to FIG. 1. In FIG. 1, reference character 1a indicates the regular position of the original, reference character 1b the position of the original when the original supporting table, not shown, has flexed, and the reference character 1c the condition of the original which has floated up from the original supporting table. When the original supporting table, not shown, flexes, the original assumes the position 1b. However, the positional relation between the imaging lenses 4a, 4b and the solid state image pick-up elements 5a, 5b does not change and the imaging principal rays 9a, 9b, 9c and 9d at the maximum angle of view form the same angle as that when the original is placed at the regular position 1a and thus, in the position 1b of the original, the portion A of the original is not read by the element 5a or 5b. Thus, the information which has existed in the portion A of the original is missing from the formed electrical signals.

On the other hand, when the original floats up from the original supporting table and assumes the position 1c, the information which has existed in the portion B of the original 1c is read by both of the elements 5a and 5b.

Also, there is a device in which, when the illumination of the original on the points 1a', 1a''' side is lower than the illumination at the central portion of the original, the lens 4a is disposed at a position more toward the point 1a' than the position of FIG. 1 and the lens 4b is also disposed at a position more toward the point 1a''' than the position of FIG. 1, whereby an attempt is made to make the illuminations at the opposite ends of the image pick-up elements 5a, 5b into the same degree, but in this case, the width of the areas A and B becomes greater than that in FIG. 1.

SUMMARY OF THE INVENTION

It is an object of the present invention to provide a device which can eliminate the inconveniences peculiar to the above-described prior art device.

It is a further object of the present invention to provide a device which can eliminate the inconveniences peculiar to the above-described prior art device by a simple construction.

Other objects and features of the present invention will become apparent from the following detailed description taken in conjunction with the accompanying drawings.

DESCRIPTION OF THE PREFERRED EMBODIMENT

Figure 2:
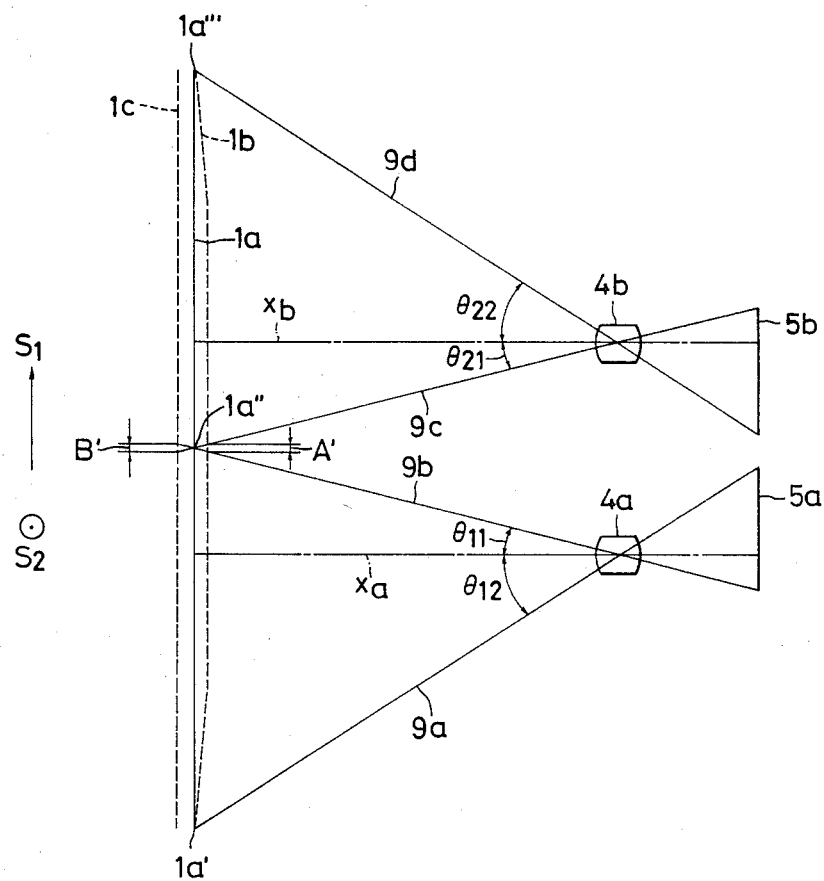
FIG. 2 illustrates the principle of the original reading device according to the present invention.

In FIG. 2, of the linear area to be read of an original supported on an unshown original supporting table which is disposed lengthwise in the major scanning direction $S_1$, the lower half area (the area between points $1a'$ and $1a''$) is projected and imaged upon the linear light-receiving area of a solid state image pick-up element $5a$ such as CCD which is long in the major scanning direction by a lens $4a$ and the upper half area (the area between points $1a''$ and $1a'''$) is projected and imaged upon the linear light-receiving area of a solid state image pick-up element $5b$ such as CCD which is long in the major scanning direction by a lens $4b$. Thus, the elements $5a$ and $5b$ electrically scan the images of the lower half area and the upper half area, respectively, of the original and form electrical signals corresponding to the respective images.

The magnification at which the lens $4a$ forms the original image on the element $5a$ and the magnification at which the lens $4b$ forms the original image on the element $5b$ may differ from each other, but where the elements $5a$ and $5b$ have substantially the same picture element pitch (the spacing between the centers of adjacent picture elements), it is preferable that the above-mentioned two magnifications be substantially the same. In order to make said two magnifications substantially the same, it is preferable in making the construction of the optical system simple to use lenses of substantially the same focal length as the lenses $4a$ and $4b$, make the optical path length from the original $1a$ lying at a regular position to the lens $4a$ and the optical path length from the original $1a$ to the lens $4b$ substantially the same and make the optical path length from the lens $4a$ to the image pick-up element $5a$ and the optical path length from the lens $4b$ to the image pick-up element $5b$ substantially the same.

Now, in FIG. 2, if it is assumed that the angle formed by a principal ray $9a$ pointing to the image pick-up element $5a$ from point $1a'$ through the lens $4a$ with the optical axis Xa of the lens $4a$ is $\theta_{12}$ and the angle formed by a principal ray $9b$ pointing to the image pick-up element $5a$ from the boundary point $1a''$ between said two areas through the lens $4a$ with the optical axis Xa of the lens $4a$ is $\theta_{11}$, the lens $4a$ is disposed so that $\theta_{11}$ is smaller than $\theta_{12}$.

Also, if it is assumed that the angle formed by a principal ray $9d$ pointing to the image pick-up element $5b$ from point $1a'''$ through the lens $4b$ with the optical axis Xb of the lens $4b$ is $\theta_{22}$ and the angle formed by a principal ray $9c$ pointing to the image pick-up element $5b$ from point $1a''$ through the lens $4b$ with the optical axis Xb of the lens $4b$ is $\theta_{21}$, the lens $4b$ is disposed so that $\theta_{21}$ is smaller than $\theta_{22}$.

In other words, the lens $4a$ is disposed so that the optical axis Xa thereof enters the area between points $1a'$ and $1a''$ at a position more toward the point $1a''$ than the central point of said area, and the lens $4b$ is disposed so that the optical axis Xb thereof enters the area between points $1a'''$ and $1a''$ at a position more toward the point $1a''$ than the central point of said area. Accordingly, the angle of view $\theta_{11}$ at which the lens $4a$ looks at the point $1a''$ is smaller than the angle of view $\theta_{12}$ at which the lens $4a$ looks at the point $1a'$, and the angle of view $\theta_{21}$ at which the lens $4b$ looks at the point $1a''$ is smaller than the angle of view $\theta_{22}$ at which the lens $4b$ looks at the point $1a'''$.

Said angles $\theta_{11}$ and $\theta_{21}$ may differ from each other, but it is preferable that these angles $\theta_{11}$ and $\theta_{21}$ be substantially equal to each other. Also, the angles $\theta_{12}$ and $\theta_{22}$ may differ from each other, but it is preferable that these angles be substantially equal to each other. This is because the qualities of the images read by the image pick-up elements $5a$ and $5b$ can be made equal to each other and it is easy to make the balances of the quantities of light on the image pick-up elements $5a$ and $5b$ equal to each other. That is, it is preferable to position the lenses $4a$ and $4b$ so that the angle of view of the lens $4a$ with respect to the point $1a''$ is substantially equal to the angle of view of the lens $4b$ with respect to the point $1a''$ and that the angle of view of the lens $4a$ with respect to the point $1a'$ is substantially equal to the angle of view of the lens $4b$ with respect to the point $1a'''$. In order that $8_{11}=\theta_{21}$ and $\theta_{12}=\theta_{22}$ as described above in a device wherein the imaging magnification of the lens $4a$ and the imaging magnification of the lens $4b$ are made equal to each other by using lenses of substantially the same focal length as the lenses $4a$ and $4b$ as mentioned above, making the object side optical path lengths of the lenses $4a$ and $4b$ substantially equal to each other and making the image side optical path lengths of the lenses $4a$ and $4b$ substantially equal to each other, the lenses $4a$ and $4b$ are disposed so that the optical axes Xa and Xb assume substantially the same distance with respect to the normal set up at the point $1a''$ to the original $1a$ disposed at the regular position.

The principal rays $9b$ and $9c$ from the boundary $1a''$ between said two areas of the original enter the image pick-up elements $5a$ and $5b$, respectively, but the boundary $1a''$ between said two areas is read by one of the elements $5a$ and $5b$. The linear light-receiving areas of the elements $5a$ and $5b$ are oriented in a direction corresponding to the lengthwise direction of the portion $1a$ to be read. That is, the numerous picture elements of the elements $5a$ and $5b$ are arranged in the direction $S_1$.

Figure 1:
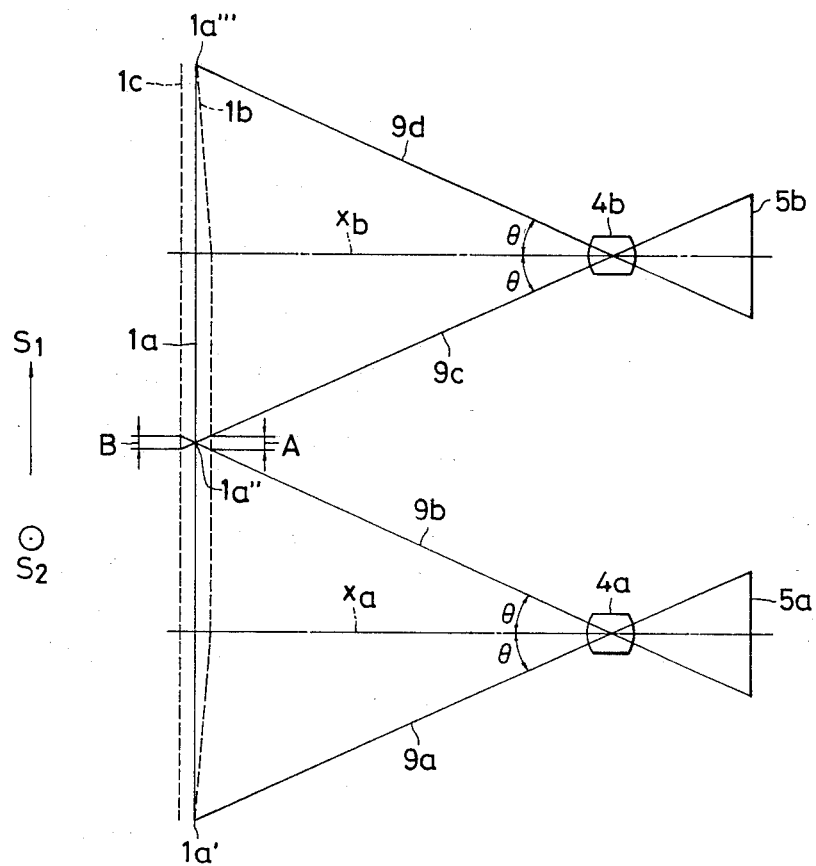
FIG. 1 illustrates the principle of the original reading device according to the prior art.

In any case, if the lenses $4a$ and $4b$ are disposed so that $\theta_{11}<\theta_{12}$ and $\theta_{21}<\theta_{22}$ as described above, even if the portion to be read is displaced to $1b$ as described in connection with FIG. 1, the portion which is not read becomes A' which is smaller than A of FIG. 1, and even if the portion to be read is displaced to $1c$, the portion which is overlappingly read becomes B' which is smaller than B of FIG. 1. That is, the amount of information which is not read or is overlappingly read at the boundary between said two areas can be checked to a practically negligible amount.

For example, assume that the lengthwise direction of a JIS A4 original is to be read in 12 dots/mm, that a picture element of the image pick-up elements is 14μ, that the focal length of the imaging lenses $4a$ and $4b$ is 50 mm and that the distance between the optical axes Xa and Xb is 60 mm. If the deviated position in the direction of the optical axis from the regular position of the original is 0.5 mm, $\theta_{11}$ and $\theta_{21}$ are about 4.93° and therefore, the length of A' and B' is about 43μ and can be checked to a small value as compared with 12 dots/mm (1 dot=about 83μ).

Generally, the deviation of the image in the original reading device has an allowance of about 1 bit. In such a case, if the pitch of the picture elements of the image pick-up elements is P and the number of dots to be read of the linear portion to be read on the surface of the original with respect to the major scanning direction is d/mm, then the lenses $4a$ and $4b$ may form the image of the original on the image pick-up elements $5a$ and $5b$ substantially at a magnification $\beta$ ($\beta$=dp). At this time, if the focal length of the lenses 4a and 4b is f and the distance between the optical axes of the two lenses is L, in order that the deviation of the image may be checked to 1 bit or less, L may be set so that $$\frac{L/2}{f(1 + 1/\beta)} \times \Delta h \leq \frac{1}{d},$$

where $\Delta h$ is the amount of displacement from the regular position 1a of the original at the position 1a" with respect to the direction of the optical axis and usually, $\Delta h$ is 0.5 mm or less.

Of course, in a device wherein an image deviation greater than 1 bit is allowed, the lenses 4a and 4b may be disposed so that L is a value greater than that obtained by the above formula.

Figure 3:
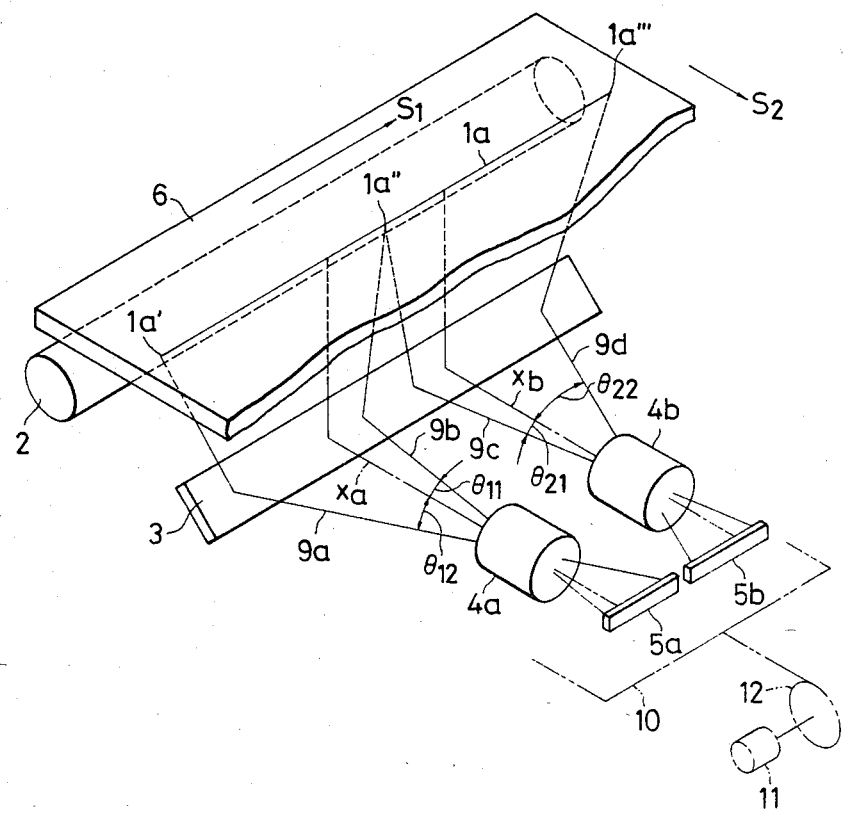
FIG. 3 is a perspective view of the original reading device according to the present invention.

Referring to FIG. 3, reference numeral 6 designates a transparent original supporting table for supporting an original thereon. The table 6 is formed of glass or a plastic material and is capable of flexing downwardly when the original is heavy.

The light beam from the portion 1a to be read of the original illuminated by an illuminating lamp 2 enters a mirror 3 and is reflected thereby substantially in parallelism to the original supporting table 6 and is imaged on solid state image pick-up elements 5a and 5b by imaging lenses 4a and 4b, respectively. That is, the image of the area between points 1a' and 1a" is electrically scanned and read in the major scanning direction $S_1$ by the element 5a and the image of the area between points 1a" and 1a''' is electrically scanned and read in the major scanning direction $S_1$ by the element 5b. The elements 5a and 5b are arranged in a row in the major scanning direction $S_1$ and the lenses 4a and 4b are also arranged in the major scanning direction $S_1$, the optical axes Xa and Xb thereof being parallel to each other. The lenses 4a and 4b are disposed so that $\theta_{11} < \theta_{12}$ and $\theta_{21} < \theta_{22}$ as previously mentioned, and preferably $\theta_{11} = \theta_{21}$ and $\theta_{12} = \theta_{22}$. Preferably, the lenses 4a and 4b have substantially the same focal length, as previously mentioned, the optical path length from the table 6 in its non-flexed condition to the lens 4a is substantially equal to the optical path length from the table 6 to the lens 4b, the optical path length from the lens 4a to the element 5a is substantially equal to the optical path length from the lens 4b to the element 5b, the distance from the point 1a" on the table 6 in its non-flexed condition to the optical axis Xa is substantially equal to the distance from said point 1a" to the optical axis Xb, and the distance from the point 1a' on the table 6 in its non-flexed condition to the optical axis Xa is substantially equal to the distance from the point 1a''' on the table 6 in its non-flexed condition to the optical axis Xa.

Since $\theta_{11} < \theta_{12}$ and $\theta_{21} < \theta_{22}$, the distance between the optical axis Xa and the point 1a" is smaller than the distance between the optical axis Xa and the point 1a', and the distance between the point 1a" and the optical axis Xb is smaller than the distance between the point 1a' and the optical axis Xb.

The elements 2, 3, 4a, 4b, 5a and 5b are secured to a suitable carriage 10, and this carriage 10 is moved in the direction of arrow $S_2$ by a motor 11 through a pulley-wire mechanism 12. Thereby the original is optically scanned in the minor scanning direction. That is, the image pick-up elements 5a and 5b are moved relative to the original in a direction perpendicular to the major scanning direction. Substantially the whole surface of the original is read by a combination of major scanning and minor scanning.

Although, in FIG. 3, the illuminating lamp, the reflecting mirror, the imaging lenses and the solid state image pick-up elements are moved as a unit to optically scan the original in the minor scanning direction, the optical scanning of the original in the minor scanning direction will be possible even by adopting a well-known scanning optical system in which the imaging lenses and solid state image pick-up elements are fixed and two or three reflecting mirrors are used and these mirrors and the illuminating lamp are moved, or by moving the original supporting table.

What is claimed is:

1. An original reading device comprising:
an original supporting surface for supporting an original thereon;
means for illuminating the original;
first and second solid state image pick-up elements for scanning optical images received thereby in the major scanning direction to form electrical signals corresponding to said received optical images, said first and second solid state image pick-up elements being disposed in spaced relation in the major scanning direction;
means for scanning the original in the minor scanning direction;
a first lens for forming, of a first area and a second area of the original separated by a boundary and arranged in the major scanning direction, the optical image of said first area on said first solid state image pick-up element, an optical axis of said first lens being incident on said first solid state image pick-up element; and
a second lens for forming the optical image of said second area of the original on said second solid state image pick-up element, an optical axis of said second lens being incident on said second solid state image pick-up element;
said first lens being disposed at such a position that the angle of view $\theta_{11}$ of said first lens with respect to said boundary is smaller than the angle of view $\theta_{12}$ of said first lens with respect to the end of said first area opposite to said boundary; and
said second lens being disposed at such a position that the angle of view $\theta_{21}$ of said second lens with respect to said boundary is smaller than the angle of view $\theta_{22}$ of said second lens with respect to the end of said second area opposite to said boundary.

2. The device according to claim 1, wherein the focal lengths of said first and second lenses are substantially the same, and the imaging magnification at which said first lens forms the image of said first area on said first image pick-up element and the imaging magnification at which said second lens forms the image of said first area on said second image pick-up element are substantially the same.

3. The device according to claim 2, wherein said first and second lenses are disposed so that $\theta_{11} = \theta_{21}$ and $\theta_{12} = \theta_{22}$.

4. An original reading device comprising:
an original supporting surface for supporting an original thereon;
means for illuminating the original;
first and second solid state image pick-up elements for scanning optical images received thereby in the major scanning direction to form electrical signals corresponding to said received optical images, said first and second solid state image pick-up elements being disposed in spaced relation in the major scanning direction;

means for scanning the original in the major scanning direction;

a first lens for forming, of a first area and a second area of the original separated by a boundary and arranged in the major scanning direction, the optical image of said first area on said first solid state image pick-up element, an optical axis of said first lens being incident on said first solid state image pick-up element; and a second lens for forming the optical image of said second area of the original on said second solid state image pick-up element, an optical axis of said second lens being incident on said second solid state image pick-up element;

said first lens being disposed at such a position that the angle of view $\theta_{11}$ of said first lens with respect to said boundary is smaller than the angle of view $\theta_{12}$ of said first lens with respect to the end of said first area opposite to said boundary.

* * * * *

UNITED STATES PATENT AND TRADEMARK OFFICE
CERTIFICATE OF CORRECTION

PATENT NO. : 4,543,491

DATED : September 24, 1985

INVENTOR(S) : MASAMICHI TATEOKA, ET AL.

It is certified that error appears in the above-identified patent and that said Letters Patent is hereby corrected as shown below:

Column 1: lines 41 and 42, change italics "is projected and imaged upon the light-receiving area of CCD5" to roman.

Column 3: line 10, change "long" to --disposed lengthwise--;

line 15, change "long" to --disposed lengthwise--.

Column 4: line 17, change "$8_{11}$" to --$\emptyset_{11}$--.

Column 6: line 55, change "said first area" to --said second area--.

Signed and Sealed this

Eighteenth Day of March 1986

[SEAL]

Attest:

DONALD J. QUIGG

Attesting Officer

Commissioner of Patents and Trademarks